Sept. 10, 1957     W. H. STANTON     2,805,733
PURIFICATION OF ETHYLENE
Filed March 9, 1956
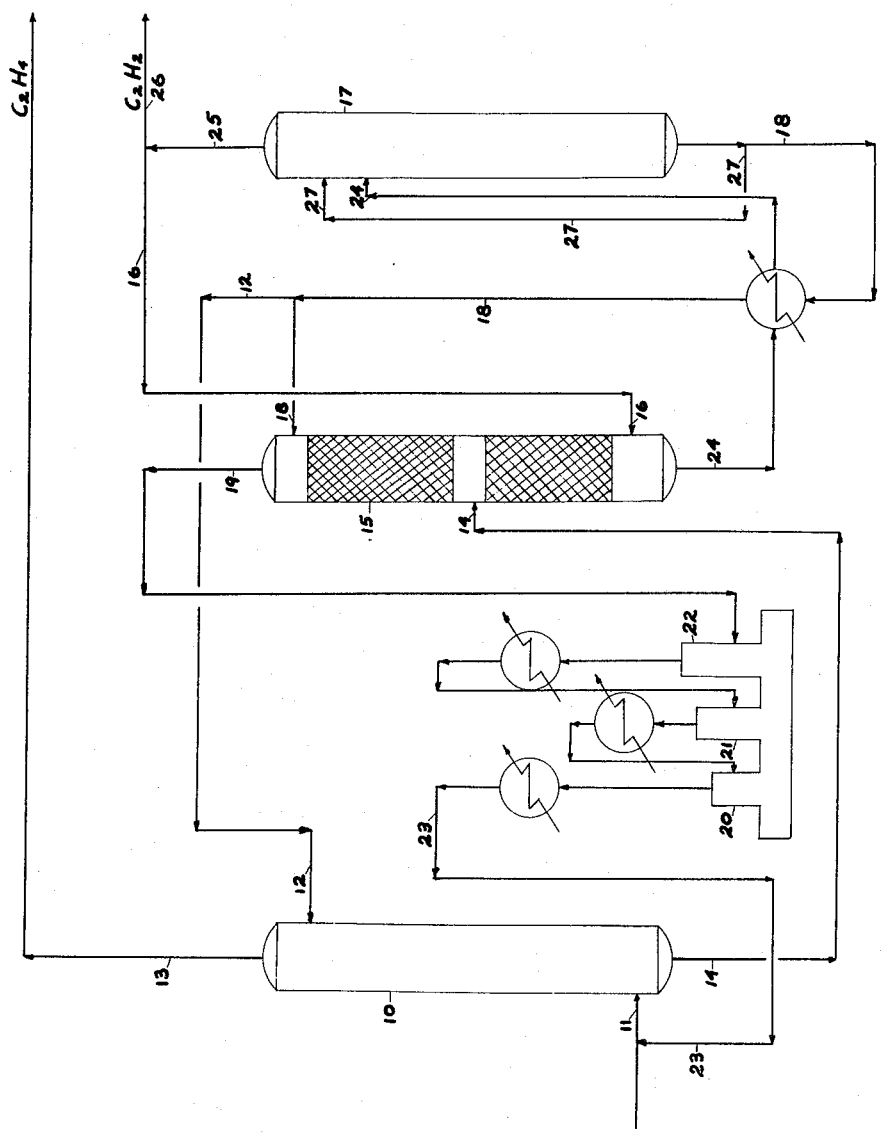
INVENTOR
WALTER H. STANTON
BY
ATTORNEY

2,805,733

PURIFICATION OF ETHYLENE

Walter H. Stanton, Texas City, Tex., assignor to Monsanto Chemical Company, St. Louis, Mo., a corporation of Delaware Application March 9, 1956, Serial No. 570,561

4 Claims. (Cl. 183—115)

This invention relates to a process for obtaining pure ethylene and, more particularly, it relates to an improved process for the removal of minute concentrations of acetylene from ethlyene.

After subjection to the conventional methods of purification, commercial high-purity ethylene still contains small or trace amounts of acetylene. For many purposes, this impurity in the ethylene can be tolerated, but for certain uses in the chemical industry, such as, for example, in the catalytic addition of water gas to ethylene for the manufacture of aldehydes and alcohols, the production of ethylene oxide, and particularly in processes for producing polyethylene, even very small amounts of acetylene as an impurity are detrimental. Hence, it becomes necessary to produce ethylene essentially free of all traces of acetylene.

It is well known that acetylene may be separated from gases containing it by treating the gas with a solvent having selective absorption power for the acetylene. Numerous solvents have been used for this purpose, among which may be mentioned the more common or better known ones such as water, acetone, dimethylformamide, butyrolactone, triethyl phosphate and diethyl carbonate, for example. The normal procedure for separation and recovery of acetylene from gas mixtures by means of absorption in a preferential liquid solvent comprises absorbing the acetylene in the solvent in an absorption tower, removing the gases which are soluble to a slight extent in the solvent in a stripping tower where acetylene is partially vaporized and used to strip out such gases, and then flashing the acetylene from the solvent for recovery in a pure state. While this technique is generally efficient in acetylene recovery from dilute gases, it is not completely satisfactory for removing very small quantities of acetylene from ethylene because of the relative concentrations which must be maintained in the streams in various parts of the system to effect efficient and economic separation, and the necessity for controlling the concentration of acetylene in the recycle stream fed to the compressors because of the inherent dangers and hazards associated with the handling of acetylene-containing streams. Certain refinements or improvements are required in the general method to make it adaptable to the purification of ethylene and it is, therefore, an object of this invention to provide such refinements in an improved safe process for accomplishing the removal of essentially all the acetylene impurity from an ethylene stream. Other objects and advantages of the invention will become apparent from the following description of the invention.

According to the invention, ethylene containing a small amount of acetylene is processed according to the following combination of steps. The gas mixture is contacted in an absorber with an organic solvent having selective dissolving power for acetylene, and ethylene free from acetylene is withdrawn overhead from this column. The acetylene-containing solvent is led from the bottom of the absorber into the mid-section of a combination stripper-absorber or a prestripper in which acetylene released from the solvent in a later stage of the process is passed upward as a stripping gas and fresh solvent is fed in at the top of the column to control the concentration of acetylene in the ethylene taken overhead for recycling through a compressor to the absorber. The rich solvent stream from this stripper-absorber is introduced into a desorber column where acetylene is released from the solvent and the lean solvent is recirculated to the absorber.

The combined stripper-absorber is not ordinarily employed in an acetylene recovery system but is a feature of the present process. Commercial ethylene is ordinarily produced at high pressures and is utilized at high pressures. The most satisfactory system for removal of very small quantities of acetylene from such ethylene, therefore, is one which can be operated to maintain ethylene at the desired high pressures without excess ethylene loss. Separation of acetylene by solvent absorption is favored at high pressures but a significant proportion of ethylene is usually also absorbed under these conditions and must be recovered for recycle purposes. Since stripping is favored at low pressures and substantially complete recovery of ethylene cannot be achieved without concomitant release of acetylene, the problem arises of maintaining control of the recycle stream composition to secure the maximum recovery of ethylene and yet maintain acetylene concentration at such a level as to ensure operation in the safe limits when the stream is subjected to the significant pressure step-up in the recycling step. This problem is solved in the process of the invention by subjecting the rich solvent in the stripper-absorber column or prestripper, containing the conventional means for favoring the exchange of gases and liquids, to the action of the gas obtained in the desorption step, so that any ethylene dissolved in the solvent is replaced by acetylene in the lower or stripping section of the column while at the same time the concentration of acetylene in the overhead ethylene recycle stream is effectively controlled at the desired level by controlling the amount of solvent introduced into the top or absorbing section of this column.

The invention will be more readily understood from the following detailed description of a preferred embodiment as illustrated in the drawing which is a diagrammatic flow sheet of the process. A stream of ethylene containing 90 volume percent or more of ethylene and from 1 to 2 volume percent of acetylene, the other constituents of the gas being methane and ethane, is introduced at a pressure of about 375 p. s. i. g. into the absorption column 10 via line 11 at a rate of approximately 16,000 lb. per hour. The gas travels upward through the absorber countercurrent to a stream of dimethylformamide flowing downward from the top of the column it is introduced at a temperature of about 10° F. through line 12 at a rate of approximately 20,000 lb. per hour. Acetylene is absorbed from the gas and ethylene containing less than 0.01% acetylene is withdrawn overhead through line 13 at a rate of around 13,700 lb. per hour.

The dimethylformamide containing acetylene is transferred at a rate of about 20,000 lb. per hour from the bottom of the absorber through line 14 to the absorber-stripper 15 maintained at a pressure of approximately 0.7 p. s. i. g. In this column which is operated cold, i. e., at a temperature of about 10 to about 25° F., ethylene which has dissolved in the dimethylformamide is stripped from the solvent in the lower section by a stream of acetylene entering through line 16 and coming from the desorber 17. A stream of dimethylformamide from which all acetylene has been released in the desorber 17 (less than 5 parts per million acetylene) and which has been cooled to about 10° F. is introduced at the top of the stripper-absorber column through line 18 at a rate of approximately 72,000 lb. per hour. A gas mixture containing about 93% ethylene and less than 5% acetylene is withdrawn overhead through line 19 at a rate of 2,400 lb. per hour, passed through a series of compressors 20, 21 and 22 and recycled to the absorber through line 23.

The rich solvent is withdrawn from the bottom of the stripper-absorber column through line 24 at a rate of 94,000 lb. per hour and is heat exchanged with the lean solvent stream coming from the bottom of the desorber before it is introduced into the desorber column 17 at a temperature of approximately 322° F. and a pressure of 5 p. s. i. g. In the desorber column, acetylene is released from the solvent by the combined effect of heating and a drop in pressure and acetylene vapor is withdrawn through line 25, part of it being returned through line 16 at a rate of about 2230 lb. per hour for use as a stripping medium in the stripper-absorber column (as described previously) and the other part being transferred through line 26 at a rate of 245 lb. per hour for further purification by washing if desired or for disposal in any desired manner. The stripped solvent leaves the desorber column through line 18 at a rate of 94,000 lb. per hour. A portion of the stream is recycled to the desorber by way of line 27; another portion, after being cooled by exchange with rich solvent, is fed to the stripper-absorber as described previously; still another portion is recycled to the absorber column via line 18 and line 12.

The invention is not dependent upon the use of any particular solvent. Any organic solvent which is chemically inert to acetylene and other impurities in the ethylene and is capable of dissolving acetylene selectively may be employed. Among those which may be utilized are aliphatic carbonyl compounds, for example, aliphatic ketones such as acetone and methyl ethyl ketone, acetals of such ketones or of aliphatic aldehydes or aliphatic ethers, particularly those containing a hydrophilic group, e. g., a hydroxyl group in addition to the ether-oxygen atom such as glycol monoalkyl ethers. Carboxylic acid esters containing further hydrophilic groups either in the acid or the alcohol radical, for example, lactic acid esters or glycol monoesters of lower carboxylic acids may be used. Also suitable are acid amides, particularly dialkylformamides, alkylated ureas, bisdialkyl amides of dicarboxylic acids and particularly lactams such as pyrrolidone, its N-alkyl and N-acyl derivatives and the corresponding homologous lactams. Lactones such as $\alpha$-butyrolactone and its homologues are also very suitable.

Other modifications may also be made in the process. Feed ratios of liquid and gas throughout the process will, of course, vary somewhat with different solvents depending upon the solubility of acetylene in the particular solvent employed. Temperatures and pressures in the absorber, the stripper-absorber, and the desorber may likewise be varied to suit the nature of the solvent. Conditions will be chosen so as to make the overall operation as efficient and economical as possible and particularly to insure minimizing hazards in the handling of streams containing acetylene which must be subjected to compression without resort to the usual techniques of dilution which necessitate recycle of such large gas streams as to render the overall process uneconomical both from the standpoint of capital investment as well as operation. The absorber, for example, may be operated at any pressure from atmospheric up to 30 atmospheres or more. Release of gas from the solvent in the stripper-absorber may also be effected by addition of heat to the solvent instead of the release in pressure illustrated in the example or by a combination of a release in pressure with the addition of heat. Conditions of pressure and temperature may likewise be alternated in the desorber to effect the final stripping of the solvent to render it suitable for recycle purposes. Such changes in details of procedure may be employed without departing from the scope of the invention.

What is claimed is:

1. A process for the removal of acetylene from ethylene which comprises contacting the acetylene-containing ethylene in an absorption column with an organic solvent having selective dissolving power for the acetylene, withdrawing ethylene free from acetylene overhead from said absorption column, leading the rich solvent from the bottom of the absorption column into the mid section of a combined stripping-absorption column wherein said solvent descends countercurrent to the gas obtained by subjecting the solvent emerging from the bottom of said stripping-absorption column to stripping in a separate stripping column and fresh solvent is introduced at the top of said stripping-absorption column to contact the rising vapors and remove acetylene therefrom, withdrawing a gaseous stream consisting essentially of ethylene overhead from said stripping-absorption column and recycling said stream to the absorption column, leading the solvent from the bottom of the stripping-absorption column into a separate stripping column under conditions such that acetylene contained in it is released and withdrawn overhead and recycling the solvent stripped of acetylene from the bottom of said stripping column to the absorption column.

2. A process for the removal of acetylene from ethylene which comprises contacting the acetylene-containing ethylene in an absorption column under pressure and at a temperature in the range from about 0° F. to about 25° F. with an organic solvent having selective dissolving power for the acetylene, withdrawing ethylene free from acetylene overhead from said absorption column, leading the rich solvent from the bottom of the absorption column into the mid-section of a combined stripping-absorption column maintained at a pressure substantially below that at which the absorption column is maintained but at substantially the same temperature as the latter column, wherein said solvent descends countercurrent to the gas obtained by subjecting the solvent emerging from the bottom of said stripping-absorption column to stripping in a separate stripping column and fresh solvent is introduced at the top of said stripping-absorption column to contact the rising vapors and remove acetylene therefrom, withdrawing a gaseous stream consisting essentially of ethylene overhead from said stripping-absorption column and recycling said stream to the absorption column, leading the solvent from the bottom of the stripping-absorption column into a separate stripping column where sufficient heat is supplied so that the acetylene contained in said solvent is released and withdrawn overhead from said stripping column, and recycling the solvent stripped of acetylene from the bottom of said stripping column to both the absorption column and the stripping-absorption column.

3. A process for the removal of acetylene from ethylene which comprises contacting the acetylene-containing ethylene in an absorption column under a pressure in the range from atmospheric to approximately 30 atmospheres and at a temperature in the range from about 0° F. to about 25° F. with an organic solvent having selective dissolving power for the acetylene, withdrawing ethylene free from acetylene overhead from said absorption column, leading the rich solvent from the bottom of the absorption column into the mid-section of a combined stripping-absorption column maintained at a pressure within the range from about 0.5 p. s. i. g. to about 25 p. s. i. g. and at a temperature in the range from approximately 0° F. to about 25° F. wherein said solvent descends countercurrent to the gas obtained by subjecting the solvent emerging from the bottom of said stripping-absorption column to stripping in a separate stripping column and fresh solvent is introduced at the top of said stripping-absorption column to contact the rising vapors and remove acetylene therefrom so that the acetylene content of the vapor at the top of said column does not exceed 5%, withdrawing a gaseous stream consisting essentially of ethylene overhead from said stripping-absorption column and recycling said stream to the absorption column, leading the solvent from the bottom of the stripping-absorption column into a separate stripping column where it is heated to a temperature in the range from about 300 to about 350° F. and the acetylene contained in the solvent is thus released and withdrawn overhead, and recycling the solvent stripped of acetylene from the bottom of said stripping column to both the absorption column and the stripping-absorption column.

4. A process for the removal of acetylene from ethylene which comprises contacting the acetylene-containing ethylene in an absorption column under a pressure of approximately 375 p. s. i. g. and at a temperature of about 10° F. with dimethylformamide, withdrawing ethylene free from acetylene overhead from said absorption column, leading the rich dimethylformamide from the bottom of the absorption column into the mid-section of a combined stripping-absorption column maintained at a pressure of about 0.7 p. s. i. g. and a temperature of approximately 25° F. wherein said dimethylformamide descends in countercurrent to the gases obtained by subjecting the dimethylformamide emerging from the bottom of said stripping-absorption column to stripping in a separate stripping column and wherein fresh dimethylformamide is introduced at the top of said stripping-absorption column to contact the rising vapors and remove acetylene therefrom so that the acetylene content of the vapor at the top of said column does not exceed 5%, withdrawing a gaseous stream consisting essentially of ethylene overhead from said stripping-absorption column and recycling said stream to the absorption column, leading the dimethylformamide solvent from the bottom of the stripping-absorption column into a separate stripping column where it is heated to a temperature in the range from about 300 to 350° F. and the acetylene contained in the dimethylformamide is thus released and withdrawn overhead, and recycling the dimethylformamide stripped of acetylene from the bottom of said stripping column to both the absorption column and the stripping-absorption column.

References Cited in the file of this patent

UNITED STATES PATENTS

| | | |
|---|---|---|
| 2,250,925 | Babcock | July 29, 1941 |
| 2,613,132 | Hutchinson | Oct. 7, 1952 |
| 2,719,601 | Bartholome et al. | Oct. 4, 1955 |
| 2,726,734 | Nirenberg | Dec. 13, 1955 |